United States Patent [19]

Horst et al.

[11] 4,205,792

[45] Jun. 3, 1980

[54] ENDCAP AND SUPPORT FOR THE FRONT EDGE OF THE WOODEN FLOOR OF A MANURE SPREADER

[75] Inventors: Ray K. Horst, Stevens; Warren H. Brackbill, Paradise, both of Pa.

[73] Assignee: Sperry Rand Corporation, New Holland, Pa.

[21] Appl. No.: 883,763

[22] Filed: Mar. 6, 1978

[51] Int. Cl.² .............................................. A01C 19/00
[52] U.S. Cl. .................................... 239/679; 198/735
[58] Field of Search ............................... 239/671–673, 239/679, 680; 104/172 B; 198/735, 841

[56] References Cited

U.S. PATENT DOCUMENTS

| | | | |
|---|---|---|---|
| 1,038,814 | 9/1912 | Alexander | 239/679 X |
| 2,239,076 | 4/1941 | Biedess | 198/841 |
| 2,794,212 | 6/1957 | Warsack | 198/841 X |
| 2,894,756 | 7/1959 | McDonough | 239/680 X |

*Primary Examiner*—Johnny D. Cherry
*Attorney, Agent, or Firm*—Larry W. Miller; John B. Mitchell; Frank A. Seemar

[57] ABSTRACT

An improved support for the forward end portion of the wooden floor of a manure spreader is disclosed. The forward edge of the floor is enclosed by a channel-shaped cap portion which is in turn supported by an elongated brace member affixed at its ends to structural elements of the spreader. The cap portion may extend across the entire edge of the floor; however, its primary advantages may be obtained by making it substantially conterminous with the conveyor chain width.

9 Claims, 3 Drawing Figures

ENDCAP AND SUPPORT FOR THE FRONT EDGE OF THE WOODEN FLOOR OF A MANURE SPREADER

BACKGROUND OF THE INVENTION

This invention relates generally to manure spreaders, and specifically to apparatus for protecting and supporting the forward end of the wooden floor of a manure spreader.

Manure spreaders generally consist of an open-ended spreader box into which material, such as manure, is loaded for subsequent unloading and spreading, a conveyor within the spreader box for advancing the load of manure rearwardly toward the open end, and a beater mechanism located at the open end of the spreader box for spreading and distributing manure stored therein over the ground. Generally speaking, the conveyor comprises a pair of spaced apart endless chains supported at each end of the floor and joined together by a multiplicity of angle-iron slats extending transversely across the floor. Through a power transfer mechanism, the chains are moved lengthwise around the floor of the spreader to engage the material in the box and transport it toward the spreading mechanism at the rear end.

Though many other materials have been tried, spreader floors are most often made of a wooden material. Wood can be treated to withstand the acids and liquids encountered in machines of this type, and also have less tendency to adherence by frozen manure. The wooden floors may be either single or multiple sheets, or may comprise a multiplicity of side-by-side planks extending lengthwise from the front of the box to the rear.

Because of the type of environment in which manure spreaders are used, it is not uncommon for one or more of the angle-iron slats to become bent during use. A bent slat is a very serious problem, especially when the floor of the box is made of wood. More specifically, when a bent slat is moving from the bottom of the floor around the front toward the top, it has a tendency to engage the front edge of the floor and either break the floor through splintering or jam the drive system and cause damage to the conveyor itself, or both. The invention to be described below substantially eliminates this problem and additionally strengthens the support of the forward edge portion of the floor.

SUMMARY OF THE INVENTION

It is an object of the instant invention to provide an endcap for the forward edge of a wooden floor of a manure spreader to deflect bent conveyor slats.

It is another object of the instant invention to provide novel means of supporting the forward edge portion of a wooden floor of a manure spreader which requires none of the conventional hardware for holding the floor board(s) in position.

It is a further object of the instant invention to provide means for reducing the potential hazards encountered in a manure spreader with a wooden floor due to bending of the conveyor slats.

It is a still further object of the instant invention to provide means for improving the efficiency of a manure spreader, and simultaneously reducing the cost thereof.

These and other objects are obtained according to the instant invention by providing an improved support for the forward end portion of the wooden floor of a manure spreader. The forward edge of the floor is enclosed by a channel-shaped cap portion which is in turn supported by an elongated brace member affixed at its ends to structural elements of the spreader. The cap portion may extend across the entire edge of the floor; however, its primary advantages may be obtained by making it substantially conterminous with the conveyor chain width.

BRIEF DESCRIPTION OF THE DRAWINGS

For a better understanding of the invention, as well as other objects and further features thereof, reference is made to the following detailed disclosure of the invention taken in conjunction with the accompanying drawings wherein.

DESCRIPTION OF THE PREFERRED EMBODIMENT

The manure spreader to be generally described below is of a type well known in the art. The characteristics of a spreader which give value to the instant invention are that the floor be made of a wooden material, and that the conveyor be of the type having slats which extend transversely across the bed of the box.

Figure 1:
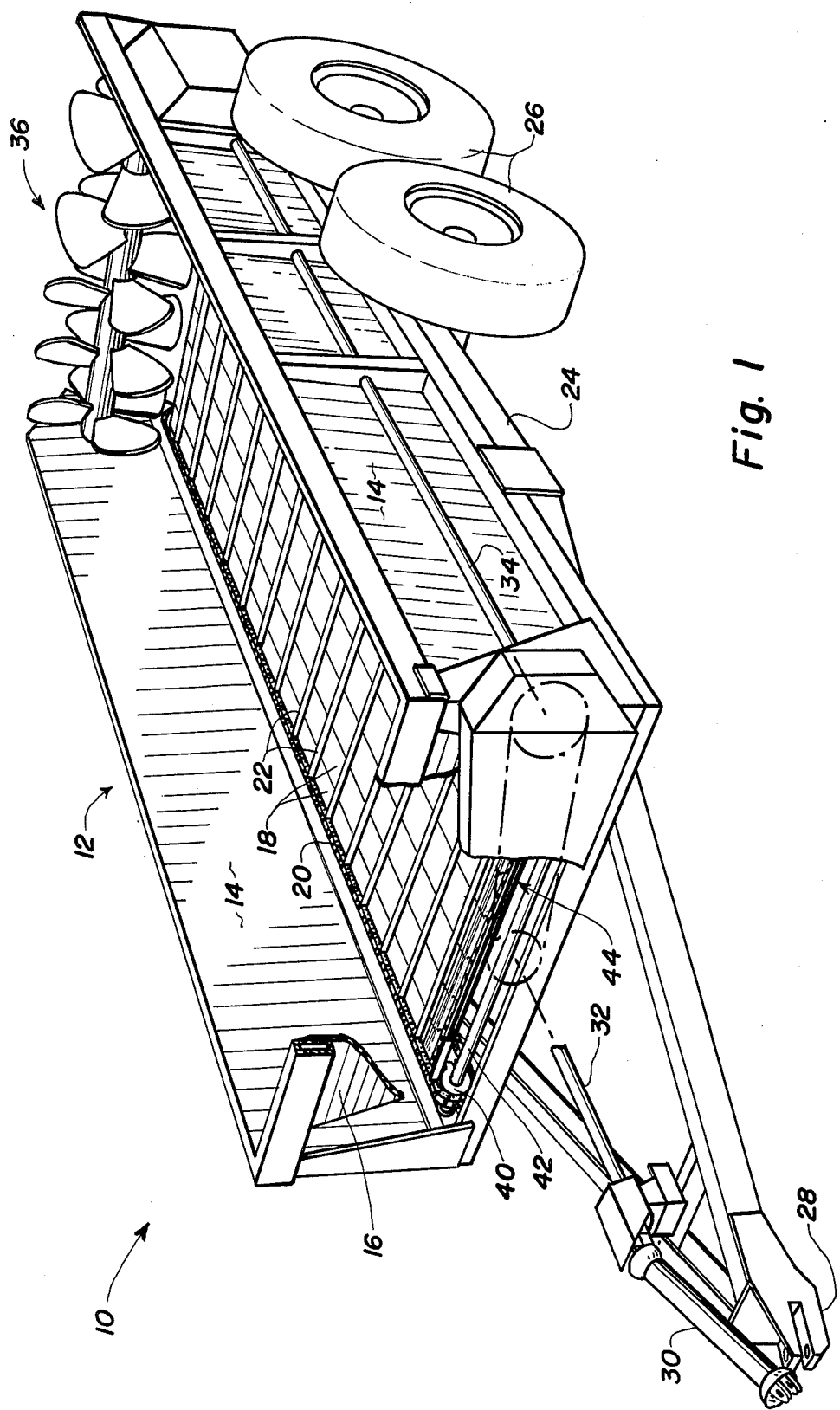
FIG. 1 is a perspective, partially cross sectional view of a manure spreader employing the instant invention.

Referring now to the drawings, and particularly to FIG. 1, there is shown a manure spreader, being indicated generally by the reference numeral 10, which incorporates the preferred embodiment of the present invention. The manure spreader is of the conventional type which comprises an open-ended spreader box 12 having longitudinally extending side walls 14, a front wall 16, a floor made up of either individual elongate boards 18 or wooden sheets, and an apron conveyor comprised of opposing chains, only one of which, 20, can be seen, and spaced slats 22 extending transversely of bed 18 between the opposing chains. The spreader box 12 is mounted on a frame 24 which is supported for travel across the ground by left and right pairs of tandem wheels 26, only the left pair of wheels being shown in FIG. 1. Frame 24 terminates forwardly in a hitch 28 which may be readily affixed to a tractor or other similar vehicle. A conventional power take off 30 is used to transfer power to shaft 32, shaft 34, and eventually to the rear of the box for driving the floor conveyor and conventional spreading mechanism 36.

As should be readily apparent of those skilled in the art of manure spreaders, the floor conveyor more specifically comprises a pair of elongate endless chains supported for movement around the floor of the box by front and rear sprockets. Because of the mechanical advantage, it is generally the rear sprockets which are driven causing the transverse slats to engage the bottom of the pile of material in the box and transport it rearwardly for engagement and distribution by the spreading mechanism 36.

Figure 2:
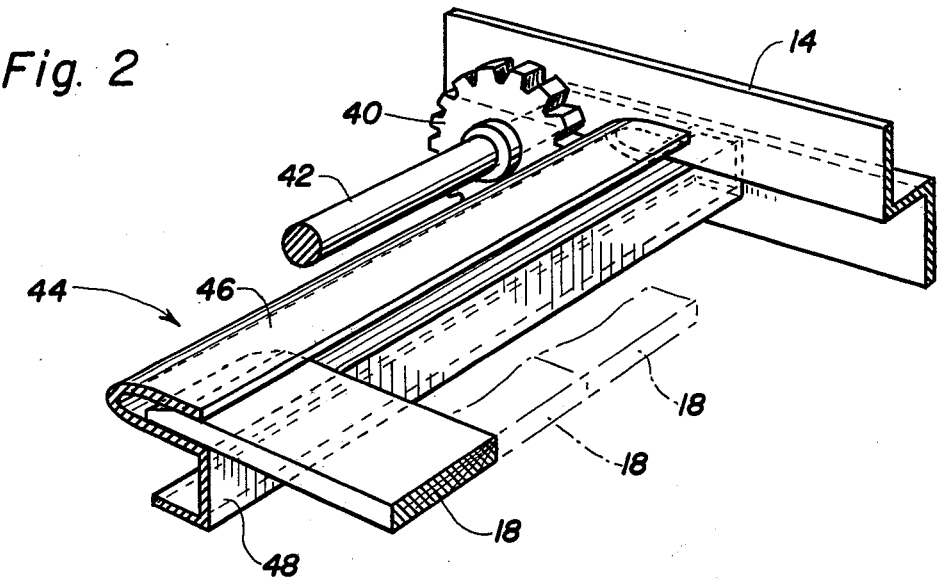
FIG. 2 is a perspective, sectional view of the forward edge of the box floor showing the endcap of the instant invention.
Figure 3:
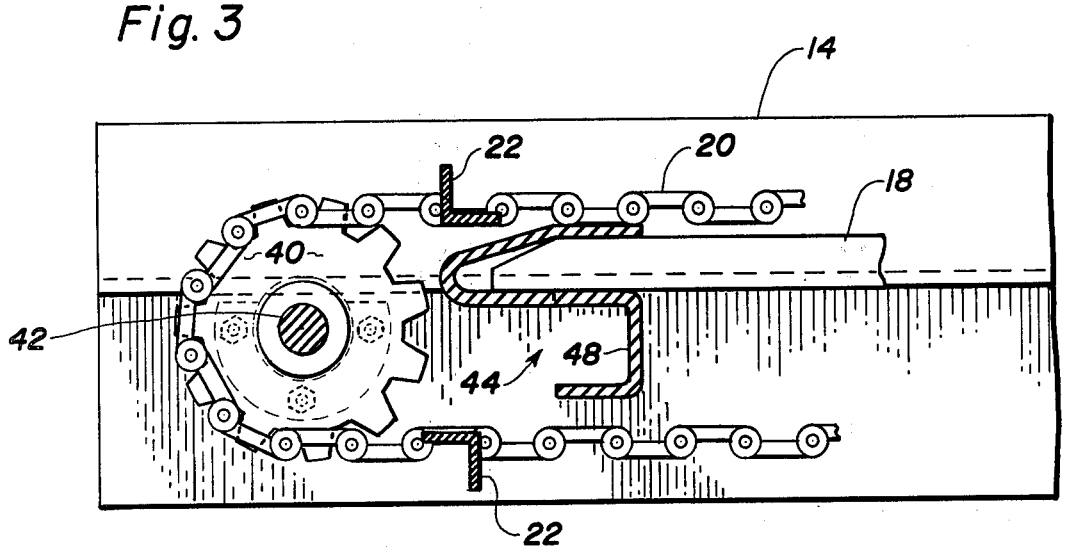
FIG. 3 is an end elevational sectional view of the apparatus of FIG. 2 with the addition of a floor conveyor.

Referring now to FIGS. 2 and 3, the specific structure making up the instant invention will be described. FIG. 2 is a prespective sectional view of the forward portion of the floor of the box showing the side wall 14, forward conveyor sprocket 40 mounted on shaft 42, floor boards 18 and endcap 44. The endcap 44 comprises a cap portion 46 which is channel shaped to receive the forward ends of boards 18 in a frictional fit. A support portion, or brace, 48 extends below cap portion 46 and is affixed at the ends thereof to side walls 14. In the preferred embodiment, cap portion 46 and support portion 48 are integrally formed as a unitary member. As can be seen in this Fig., support section 48 is longer than cap portion 46 to thereby correspond with the shape of side walls 14 to form a very stable structural member. Here it should be noted that no bolts or other fixing members are needed to hold the ends of floor boards 18 in position, such being accomplished by the interfitting relationship between cap portion 46 and the forward edges of boards 18.

In FIG. 3 it can be seen that the chain 20 supports a multiplicity of L-shaped slats 22 for movement around floor 18 upon sprocket 40. The shape of endcap 44 is of particular significance when it is realized, as discussed above, that slats 22 very often become bent during use. By particular reference to FIG. 3, it can be seen that if slat 22 is bent inwardly, in the absence of endcap 44, the forward end portion of board(s) 18 could be snagged to cause extensive damage. More specifically, a bent slat could cause the board(s) 18 to be ripped upwardly and broken, and/or the driving mechanism for the floor conveyor could become jammed or otherwise damaged.

Endcap 44 substantially reduces the likelihood of a bent slat causing damage to the floor boards. As the bent slat proceeds around sprocket 40, it would be engaged by the endcap portion 46 and deflected upwardly into its preferred position. In any event, the shape of cap portion 46 has a tendency to eliminate interference between the slats 22 and the boards 18. Support section 48 adds a great deal of strength to the overall endcap 44 and ensures that in the event of engagement with a bent slat, the cap portion 46 does not give way.

It should be readily apparent that the instant invention is particularly advantageous in manure spreaders employing separate floor boards; however, the forward edge of a sheet of wood, such as plywood, could also be beneficially protected by the endcap of the instant invention.

It will be understood that various changes of the details, materials, steps and arrangement of parts which have been described and illustrated in order to explain the nature of the invention will occur to, and may be made by those skilled in the art upon a reading of the disclosure within the principals and scope of the invention.

Having thus described the invention, what is claimed is:

1. In a manure spreader of the type adapted to be pulled behind a tractor and having a wagon type frame structure with a front wall, opposed side walls, a rear end generally defined by a spreading mechanism mounted transversely between the side walls, a floor with top and bottom surfaces and extending from a first edge adjacent the front wall to a second edge adjacent the rear end, means for supporting the floor and interconnecting it and the frame structure, at least one endless apron conveyor supported adjacent the first and second edges and defining a working path of travel along the top surface of the floor to convey manure toward the spreading mechanism and a return path of travel below the bottom surface of the floor, the improvement in said means for supporting the floor comprising:

an endcap for said first edge of said floor extending therealong a distance substantially equal to the width of said apron conveyor, said endcap including:

a cap portion defining a closed-ended channel with opposing substantially parallel upper and lower sides which snugly contact, respectively, said top and bottom surfaces of said floor adjacent said first edge thereof with at least a portion of said first edge extending into said channel, the closed end of said channel defined by a sloping surface directed downwardly from said upper side towards said lower side and intersecting therewith in a smooth rounded corner below said top surface of said floor; and an elongate structural portion supporting said cap portion and extending adjacent to and substantially parallel with said first edge below said floor and affixed at opposing ends thereof to said frame structure.

2. The manure spreader of claim 1 wherein said floor comprises a plurality of elongate side-by-side wooden boards extending parallel to said side walls from said first edge to said second edge.

3. The manure spreader of either claim 1 or claim 2 wherein said cap portion and said structural portion are integral.

4. The manure spreader of claim 3 wherein there are two side-by-side endless apron conveyors traversing said floor.

5. In a manure spreader of the type adapted to be pulled behind a tractor and having a wagon type body structure with a front wall, opposed side walls, a rear end generally defined by a spreading mechanism mounted transversely between the side walls, a floor comprised of a plurality of side-by-side wooden boards with top and bottom surfaces extending parallel to the side walls from a first edge adjacent the front wall to a second edge adjacent the rear end, means for supporting the floor and interconnecting the boards and the side walls, at least one endless apron conveyor supported adjacent the first and second edges and defining a working path of travel along the top surface of the floor to convey manure toward the spreading mechanism and a return path of travel below the bottom surface of the floor, the improvement in said means for supporting the floor comprising:

an endcap for said first edge of said floor extending between said opposed side walls, said endcap including:

a cap portion defining a closed-ended channel with opposing substantially parallel upper and lower sides which snugly contact, respectively, said top and bottom surfaces of said floor adjacent said first edge thereof with at least a portion of said first edge extending into said channel, the closed end of said channel defined by a sloping surface directed downwardly from said upper side towards said lower side and intersecting therewith in a smooth rounded corner below said top surface of said floor; and an elongate structural portion supporting said cap portion and extending adjacent to and substantially parallel with said first edge below said floor and affixed at opposing ends thereof to said opposed side walls.

6. The manure spreader of claim 5 wherein said cap portion and said structural portion are integral.

7. In a manure spreader of the type adapted to be pulled behind a tractor and having a wagon type frame structure with a front wall, opposed sidewalls, a rear end generally defined by a spreading mechanism mounted transversely between the sidewalls, a substantially planar floor with top and bottom surfaces and extending from a first edge adjacent the front wall to a second edge adjacent the rear end, means for supporting the floor and interconnecting it with the frame structure, at least one endless apron conveyor supported adjacent the first and second edges and defining a working path of travel along the top surface of the floor to convey manure toward the spreading mechanism and a return path of travel below the bottom surface of the floor, the improvement comprising:

an endcap for said first edge of said floor extending therealong a distance substantially equal to the distance between said sidewalls, said endcap including a cap portion defining a closed-ended channel with opposing substantially parallel upper and lower sides which snugly contact, respectively, said top and bottom surfaces of said floor adjacent said first edge thereof with at least a portion of said first edge extending into said channel, the closed end of said channel defined by a sloping surface directed downwardly from said upper side towards said lower side and intersecting therewith in a smooth rounded corner below said top surface of said floor, said upper side being above said top surface, whereby said apron conveyor may be deflected upwardly by said endcap over said first edge and onto said top surface, and means for affixing said cap portion to said floor.

8. The manure spreader of claim 7 wherein said floor comprises a plurality of elongate side-by-side wooden boards extending parallel to said sidewalls from said first edge to said second edge.

9. The manure spreader of claim 7 wherein there are two side-by-side endless apron conveyors traversing said floor.

* * * * *